US008828508B2

(12) United States Patent
Ohishi et al.

(10) Patent No.: US 8,828,508 B2
(45) Date of Patent: Sep. 9, 2014

(54) NEMATIC LIQUID CRYSTAL COMPOSITION AND LIQUID CRYSTAL DISPLAY ELEMENT USING SAME

(75) Inventors: Haruki Ohishi, Kitaadachi-gun (JP); Shirou Taniguchi, Kitaadachi-gun (JP); Kunihiko Kotani, Kitaadachi-gun (JP); Kazunori Maruyama, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/111,674

(22) PCT Filed: Apr. 5, 2012

(86) PCT No.: PCT/JP2012/059347
§ 371 (c)(1),
(2), (4) Date: Nov. 22, 2013

(87) PCT Pub. No.: WO2012/141069
PCT Pub. Date: Oct. 18, 2012

(65) Prior Publication Data
US 2014/0061535 A1    Mar. 6, 2014

(30) Foreign Application Priority Data

Apr. 13, 2011    (JP) .................................. 2011-089099

(51) Int. Cl.
| C09K 19/32 | (2006.01) |
| C09K 19/30 | (2006.01) |
| C09K 19/54 | (2006.01) |
| C09K 19/12 | (2006.01) |
| C09K 19/42 | (2006.01) |
| C09K 19/18 | (2006.01) |

(52) U.S. Cl.
CPC ......... *C09K 19/3066* (2013.01); *C09K 19/3059* (2013.01); *C09K 2019/183* (2013.01); *C09K 19/18* (2013.01); *C09K 19/322* (2013.01); *C09K 19/42* (2013.01); *C09K 2019/181* (2013.01); *C09K 2019/3063* (2013.01)
USPC .................. 428/1.1; 252/299.62; 252/299.63; 252/299.66

(58) Field of Classification Search
CPC ........... C09K 19/3003; C09K 19/3059; C09K 19/3098; C09K 19/42; C09K 2019/3063; C09K 2019/3065; C09K 2019/0403; C09K 2019/0466

USPC ............ 252/299.01, 299.62, 299.66, 299.63, 252/299.5; 428/1.1
See application file for complete search history.

(56) References Cited

U.S. PATENT DOCUMENTS

| 5,279,764 A * | 1/1994 | Reiffenrath et al. ...... 252/299.66 |
| 6,210,761 B1 * | 4/2001 | Kondo et al. ................... 428/1.1 |
| 6,673,268 B1 * | 1/2004 | Rieger et al. .............. 252/299.63 |
| 8,216,489 B2 * | 7/2012 | Kobayashi ............... 252/299.63 |
| 2008/0191166 A1 | 8/2008 | Kojima et al. |
| 2010/0051864 A1 * | 3/2010 | Klasen-Memmer et al. ......................... 252/299.61 |
| 2010/0108945 A1 * | 5/2010 | Iijima et al. ............... 252/299.61 |

FOREIGN PATENT DOCUMENTS

| CN | 1896040 A | 1/2007 |
| CN | 101323786 A | 12/2008 |
| CN | 101376810 A | 3/2009 |
| JP | 11-140447 A | 5/1999 |
| JP | 11-228966 A | 8/1999 |
| JP | 2000-096058 A | 4/2000 |
| JP | 2001-354967 A | 12/2001 |
| JP | 2004-149475 A | 5/2004 |
| JP | 2005-213320 A | 8/2005 |
| JP | 2008-266567 A | 11/2008 |
| JP | 2010-024453 A | 2/2010 |
| WO | 2011/035849 A1 | 3/2011 |

OTHER PUBLICATIONS

International Search Report for PCT/JP2012/059347, Mailing Date of Jun. 19, 2012.

* cited by examiner

*Primary Examiner* — Shean C Wu
(74) *Attorney, Agent, or Firm* — Westerman, Hattori, Daniels & Adrian, LLP

(57) ABSTRACT

A liquid crystal composition in which deterioration of viscosity that is associated with an increase in Δn and an increase in Δ∈ is suppressed, and a liquid crystal display element having a markedly improved response speed by using the relevant liquid crystal composition. The liquid crystal composition has a large value of Δn and negative Δ∈, and have large absolute values thereof. Also, the liquid crystal composition has low η, has excellent liquid crystal properties, and exhibits a liquid crystal phase that is stable in a wide temperature range. Furthermore, since the liquid crystal composition is chemically stable to heat, light, water and the like, the liquid crystal composition is capable of low voltage driving, and is practically useful and highly reliable.

14 Claims, No Drawings

NEMATIC LIQUID CRYSTAL COMPOSITION AND LIQUID CRYSTAL DISPLAY ELEMENT USING SAME

TECHNICAL FIELD

The present invention relates to a nematic liquid crystal composition having negative dielectric anisotropy (Δ∈), which is useful as an electro-optical liquid crystal display material, and a liquid crystal display element using this liquid crystal composition.

BACKGROUND ART

Vertical alignment type VA-LCD's using liquid crystal compositions having negative dielectric anisotropy (negative Δ∈) can express the black of coal-black, and therefore have an excellent display quality. Thus, as high contrast liquid crystal display devices, VA-LCD's have widely penetrated into the liquid crystal TV-centered market. Furthermore, recently, in addition to the active matrix driving systems that are represented by liquid crystal TV's and the like, even in the passive matrix driving systems that are used as display devices for in-vehicle applications or electric appliance applications, the employment of VA-LCD's is increasing. In regard to the liquid crystal TV applications, in order to realize smooth movie display performance, the gap between glass substrates tends to be narrowed, while the birefringence (Δn) of the liquid crystal material tends to increase. On the other hand, in regard to the in-vehicle display devices, in order to obtain satisfactory contrast even in high time-shared driving, namely high multiplex drive with a large display capacity, a liquid crystal composition having negative Δ∈ is required to have a large Δn that has not been conventionally found, and at the same time, the liquid crystal composition is also required to have a large absolute value of Δ∈ in order to cone with voltage lowering. Many liquid crystal compounds and liquid crystal compositions have been suggested as liquid crystal materials for VA-LCD's; however, in order to increase Δn, it is necessary to increase the content of a liquid crystal compound having a large Δn in the liquid crystal composition, and in order to increase the absolute value of Δ∈, it is necessary to increase the content of a liquid crystal compound having a large absolute value of Δ∈ in the liquid crystal composition. However, when the contents of these compounds are increased, viscosity (η) is deteriorated, and consequently, the response speed is deteriorated.

Liquid crystal compositions which exhibit negative values of Δ∈ and large values of Δn have been hitherto disclosed (Patent Literatures 1 to 4). However, the liquid crystal composition described in Patent Literature 1 contains a liquid crystal compound having positive Δ∈, and the absolute value of Δ∈ is small. Furthermore, the liquid crystal compositions described in Patent Literatures 2 to 4 are such that the absolute value of Δ∈ is large but the value of Δn is not sufficiently large. Also, the liquid crystal compositions have large values of η.

Therefore, there is a demand for a liquid crystal composition which has a large absolute value of Δ∈ and a large value of Δn but a small value of η.

CITATION LIST

Patent Literature

Patent Literature 1: Japanese Patent Application Laid-Open (JP-A) No. 11-228966
Patent Literature 2: JP-A No. 11-140447
Patent Literature 3: JP-A No. 2001-354967
Patent Literature 4: JP-A No. 2000-96058

SUMMARY OF INVENTION

Technical Problem

An object of the present invention is to provide a liquid crystal composition in which deterioration of viscosity associated with an increase in Δn and an increase in Δ∈ is suppressed, and to provide a liquid crystal display element having an improved response speed, by using the relevant liquid crystal composition.

Solution to Problem

The inventors of the present invention conducted a thorough investigation in order to solve the problems described above, and as a result, they found that the problems are solved by a combination of at least two or more kinds of particular compounds. That is, there are provided a liquid crystal composition containing, as a first component, one kind or two or more kinds of compounds selected from compounds represented by Formula (I):

[Chemical Formula 1]

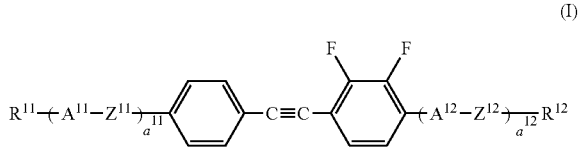

(I)

wherein $R^{11}$ and $R^{12}$ each independently represent an alkyl group having 1 to 8 carbon atoms, an alkoxy group having 1 to 8 carbon atoms, or an alkenyl group having 2 to 8 carbon atoms, while these groups are each independently unsubstituted or have at least one halogen group as a substituent, and one or two or more of —$CH_2$— present in these groups may be each independently substituted by —O—, —S—, —CO—, —COO—, —OCO— or —OCO—C— such that oxygen atoms are not directly bonded to each other;

$A^{11}$ and $A^{12}$ each independently represent a group selected from the group consisting of:

(a) a trans-1,4-cyclohexylene group (wherein one —$CH_2$— or non-adjacent two or more of —$CH_2$—, which are present in this group, may be substituted by —O— and/or —S—, (b) a 1,4-phenylene group (wherein one —CH= or non-adjacent two or more of —CH= groups, which are present in this group, may be substituted by —N=), and (c) 1,4-cyclohexenylene, 1,4-bicyclo(2.2.2) octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen;

$Z^{11}$ and $Z^{12}$ each independently represent —COO—, —OCO—, —$CH_2$O—, —$OCH_2$—, —$CF_2$O—, —$OCF_2$—, —$CH_2CH_2$—, —$CH=CH$—, —$C\equiv C$—, —$(CH_2)_4$—, —$CH=CH$—$CH_2CH_2$—, —$CH_2$—$CH_2$—$CH=CH$—, or a single bond;

$a^{11}$ and $a^{12}$ each independently represent 0 or 1; and as a second component, one kind or two or more kinds of compounds selected from compounds represented by Formulas (II) and (III):

[Chemical Formula 2]

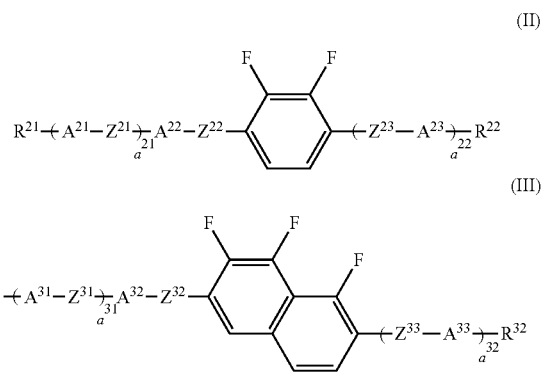

(II)

(III)

wherein $R^{21}$, $R^{22}$, $R^{31}$ and $R^{32}$ each independently represent an alkyl group having 1 to 8 carbon atoms, an alkoxy group having 1 to 8 carbon atoms, or an alkenyl group having 2 to 8 carbon atoms, while these groups are each independently unsubstituted or have at least one halogen group as a substituent, and one or two or more of —$CH_2$— present in these groups may be each independently substituted by —O—, -S—, —CO—, —COO—, —OCO— or —OCO—O— such that oxygen atoms are not directly bonded to each other;

$A^{21}$, $A^{22}$, $A^{23}$, $A^{31}$, $A^{32}$ and $A^{33}$ each independently represent a group selected from the group consisting of:

(a) a trans-1,4-cyclohexylene group (wherein one —$CH_2$— or non-adjacent two or more of —$CH_2$—, which are present in this group, may be substituted by —O— and/or —S—, (b) a 1,4-phenylene group (wherein one —CH= or non-adjacent two or more of —CH= groups, which are present in this group, may be substituted by —N=), and (c) 1,4-cyclohexenylene, 1,4-bicyclo(2.2.2)octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen;

$Z^{21}$, $Z^{22}$, $Z^{23}$, $Z^{31}$, $Z^{32}$ and $Z^{33}$ each independently represent —COO—, —OCO—, —$CH_2$—, —$OCH_2$—, —$CF_2O$—, —$OCF_2$—, —$CH_2CH_2$—, —$CH=CH$—, —$C\equiv C$—, —$(CH_2)_4$—, —$CH=CH$—$CH_2$—$CH_2$—, —$CH_2CH_2$—$CH=CH$—, or a single bond; and $a^{21}$, $a^{22}$, $a^{31}$ and $a^{32}$ each independently represent 0 or 1, and a liquid crystal display element including the relevant liquid crystal composition as a constituent member.

Advantageous Effects of Invention

The liquid crystal composition of the present invention has features of a large value of Δn, negative ΔE, and large absolute values thereof. Also, the liquid crystal composition has low η, has excellent liquid crystal properties, and exhibits a liquid crystal phase that is stable in a wide temperature range. Furthermore, since the liquid crystal composition is chemically stable to heat, light, water and the like, it is a liquid crystal composition that is capable of low voltage driving, and is practically useful and highly reliable.

DESCRIPTION OF EMBODIMENTS

In regard to the compound represented by Formula (I) as a first component, $R^{11}$ and $R^{12}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; however, an alkyl group having 1 to 5 carbon atoms, an alkoxy group having 1 to 5 carbon atoms, an alkenyl group having 2 to 5 carbon atoms, or an alkenyloxy group having 2 to 5 carbon atoms is preferred, and a linear group is preferred, $a^{11}$ represents 0 or 1; however, in the case where a high response speed is considered important, 0 is preferred, while in the case where the nematic phase upper limit temperature is considered important, 1 is preferred. Also, in the case where having a large value of Δn is considered important, 1 is preferred. $A^{11}$ and $A^{12}$ each independently represent any one of:

[Chemical Formula 3]

and one or two or more hydrogen atoms present on the benzene rings may be substituted by halogen. However, a 1,4-phenylene group or a 1,4-cyclohexylene group are preferred, and the 1,4-phenylene group may be substituted with one or two or more fluorine atoms. $A^{11}$, if present, is more preferably a 1,4-cyclohexylene group when viscosity is considered important, and $A^{12}$ is more preferably a 1,4-phenylene group when refractive index anisotropy is considered important.

More specifically, the compound represented by Formula (I) is preferably a compound represented by any one of the following Formulas (I-1) to (I-3):

[Chemical Formula 4]

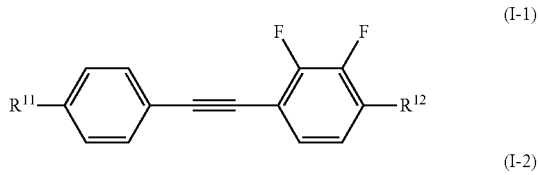

(I-1)

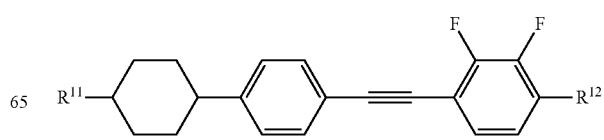

(I-2)

(I-3)

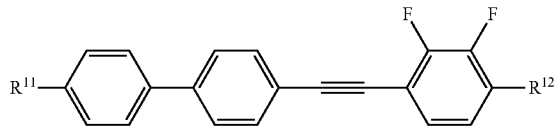

wherein $R^{11}$ has the same meaning as $R^{11}$ in Formula (I); and $R^{12}$ has the same meaning as $R^{12}$ in Formula (I)

In regard to the compounds represented by Formulas (II-1) and (II-2) as a second component, one kind or two or more kinds of compounds represented by Formula (II-1) only may be used, one kind or two or more kinds of compounds represented by Formula (II-2) may be used, or mixtures of one kind or two or more kinds of compounds represented by Formula (II-1) and one kind or two or more kinds of compounds represented by Formula (II-2) may also be used.

It is preferable that the compound represented by Formula (I) be contained in an amount of at least 2% by weight or more, but it is more preferable that the compound be contained in an amount of 2% by weight to 70% by weight, and even more preferably 2% by weight to 40% by weight.

Regarding the compounds represented by Formulas (II-1) and (II-2), $R^{21}$, $R^{22}$, $R^{31}$ and $R^{32}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms. However, an alkyl group having 1 to 5 carbon atoms, an alkoxy group having 1 to 5 carbon atoms, an alkenyl group having 2 to 5 carbon atoms, or an alkenyloxy group having 2 to 5 carbon atoms is preferred, and a linear group is preferred. $a^{21}$, $a^{22}$, $a^{31}$ and $a^{32}$ each independently represent 0 or 1; however, $a^{21}+a^{22}$ is preferably 0 or 1, and $a^{21}+a^{22}$ is preferably 0 in the case where a high response speed is considered important, while $a^{21}+a^{22}$ is preferably 1 in the case where the nematic phase upper limit temperature is considered important, $a^{31}+a^{32}$ is preferably 0 or 1, and $a^{31}+a^{32}$ is preferably 0 when a high response speed is considered important, while $a^{31}+a^{32}$ is preferably 1 when the nematic phase upper limit temperature is considered important. $Z^{21}$, $Z^{22}$, $Z^{31}$ and $Z^{32}$ each independently represent a single bond, —CH=CH—, —C≡C—, —CH$_2$O—, —OCH$_2$— or —CH$_2$CH$_2$—, but a single bond, —CH$_2$O—, —OCH$_2$— or —CH$_2$CH$_2$— is preferred. $A^{21}$, $A^{22}$, $A^{23}$, $A^{31}$, $A^{32}$ and $A^{33}$ each independently represent any one of the following:

[Chemical Formula 5]

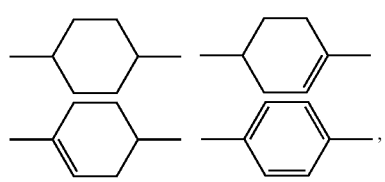

but one or two or more hydrogen atoms present on the benzene ring may be substituted by halogen. However, a 1,4-phenylene group or a 1,4-cyclohexylene group is preferred, and the 1,4-phenylene group may be substituted with one or two or more fluorine atoms. If viscosity is considered important, a 1,4-cyclohexylene group is preferred.

More specifically, the compounds represented by Formulas (II) and (III) are preferably compounds represented by the following Formulas (II-1) to (III-3):

[Chemical Formula 6]

(II-1)
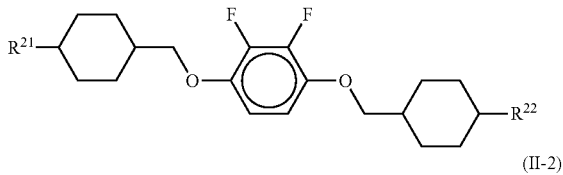

(II-2)
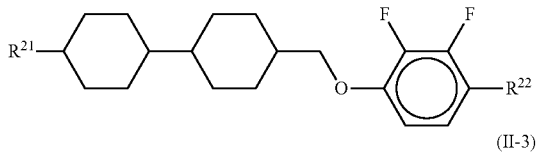

(II-3)
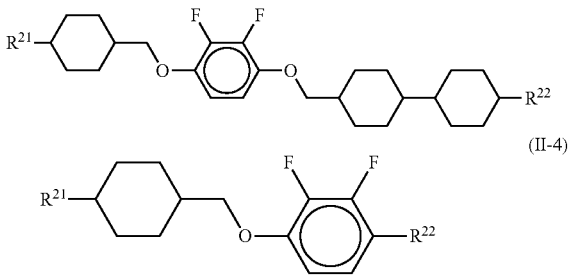

(II-4)
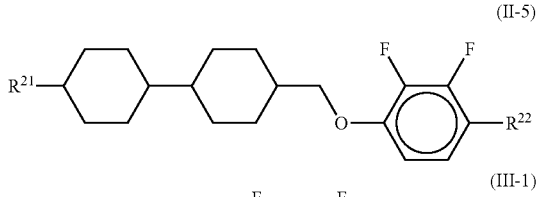

(II-5)
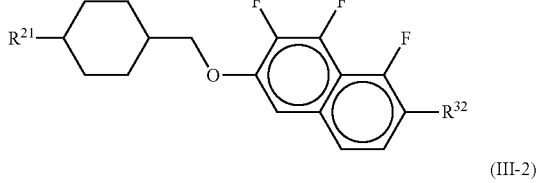

(III-1)
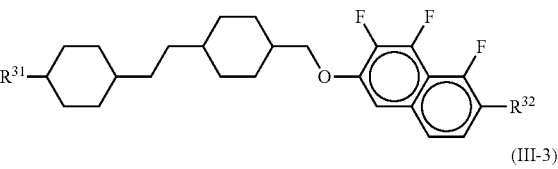

(III-2)

(III-3)
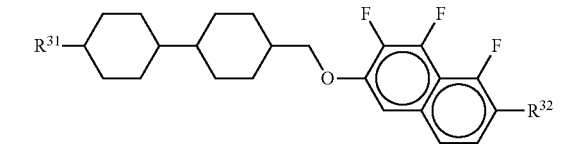

wherein $R^{21}$ has the same meaning as $R^{21}$ in formula (II); $R^{22}$ has the same meaning as $R^{22}$ in Formula (II); $R^{31}$ has the same meaning as $R^{31}$ in Formula (III); and $R^{32}$ has the same meaning as $R^{32}$ in Formula (III).

Furthermore, in the compounds represented by Formulas (II-1) and (II-3), $R^{21}$ is preferably an alkyl group or an alkenyl group, $R^{22}$ is preferably an alkyl group or an alkenyl group. Furthermore, in the compound represented by Formula (II-1), $R^{21}$ is preferably an alkenyl group, and $R^{22}$ is preferably alkyl group. In the compound represented by Formula (II-3), $R^{21}$ is preferably an alkenyl group, and $R^{22}$ is preferably an alkyl group. In the compounds represented by Formulas (II-2), (II-4) and (II-5), $R^{21}$ is preferably an alkyl group or an alkenyl group, and $R^{22}$ is preferably an alkoxy group or an alkenyloxy group. Furthermore, in the compound represented by Formula (II-2), $R^{21}$ is preferably an alkenyl group, and $R^{22}$ is preferably an alkenyloxy group. In the compound represented by Formula (I-1-4), $R^{21}$ is preferably an alkyl group, and $R^{22}$ is preferably an alkoxy group. In the compound represented by Formula (II-5), $R^{21}$ is preferably an alkyl group, and $R^{22}$ is preferably an alkoxy group. In the compounds represented by Formulas (III-1), (III-2) and (III-3), $R^{31}$ is preferably an alkyl group or an alkenyl group, and $R^{32}$ is preferably an alkoxy group or an alkenyloxy group. Furthermore, $R^{31}$ is preferably an alkyl group, and $R^{32}$ is preferably an alkoxy group.

At least one or more kinds of compounds selected from the compounds represented by Formulas (II) and (III) are used. However, it is more preferable to use two or more kinds, and it is even more preferable to use three or more kinds.

The compound represented by Formula (IV), which is a third component, is a compound having a value of Δ∈ close to zero, and may have an electron-withdrawing group in the molecule. However, it is preferable that the number of the electron-withdrawing group be 2 or less, and preferably one or less, and it is more preferable that the compound contain no electron-withdrawing group.

[Chemical Formula 7]

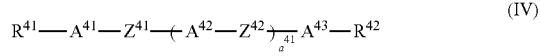

(IV)

$R^{41}$ and $R^{42}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms. However, an alkyl group having 1 to 5 carbon atoms, an alkoxy group having 1 to 5 carbon atoms, an alkenyl group having 2 to 5 carbon atoms, or an alkenyloxy group having 2 to 5 carbon atoms is preferred, and a linear group is preferred.

$A^{41}$, $A^{42}$ and $A^{43}$ each independently represent any one of the following:

[Chemical Formula 8]

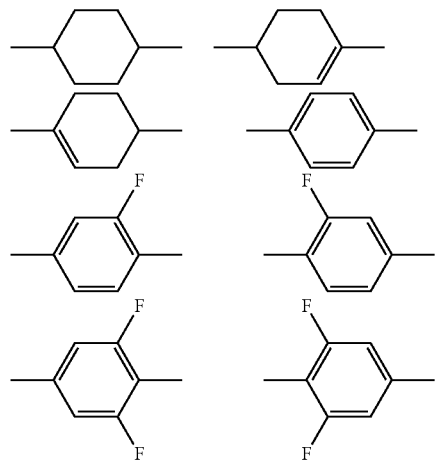

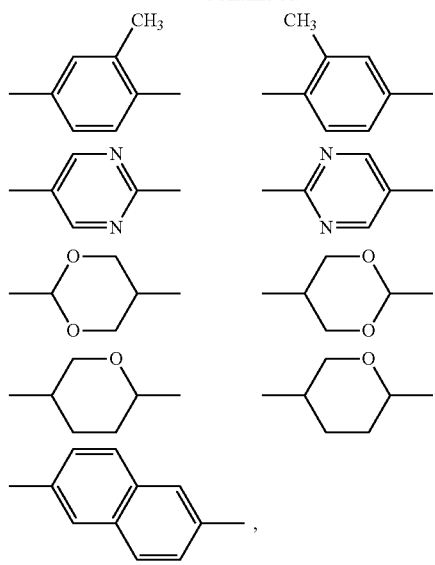

but a 1,4-phenylene group or a 1,4-cyclohexylene group is preferred, and the 1,4-phenylene group may be substituted with one or two or more fluorine atoms or methyl groups. $A^{41}$, $A^{42}$ and $A^{43}$ are not intended to represent a 2,3-dihalo-1,4-phenylene group.

$Z^{41}$ and $Z^{42}$ each independently represent a single bond, —C≡C—, —C=N—N=C—, —CH=CH—, —CF=CF—, —CF$_2$O—, —OCF$_2$—, —COO— or —OCO—; however, a single bond, —CH$_2$CH$_2$—, —C≡C—, —COO— or —OCO— is preferred, and a single bond or —C≡C— is preferred. $a^{41}$ represents 0, 1 or 2, but 0 or 1 is preferred. When plural $A^{42}$'s are present, they may be identical or different from each other, and when plural $Z^{42}$'s are present, they may be or different from each other.

More specifically, the compound represented by Formula (IV) is preferably a compound represented by any one of the following formulas (IV-1) to (IV-10):

[Chemical Formula 9]

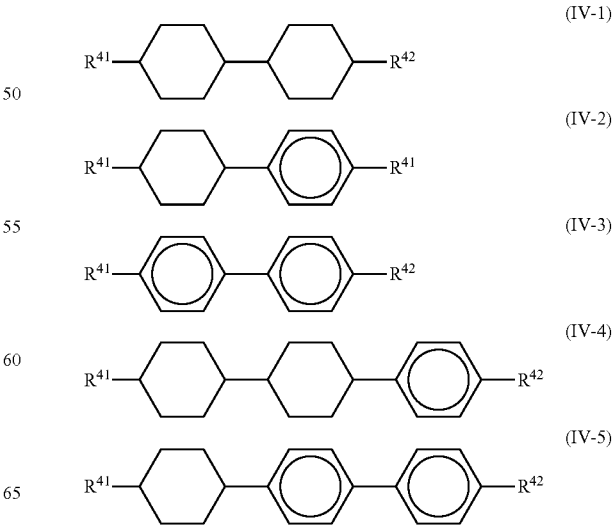

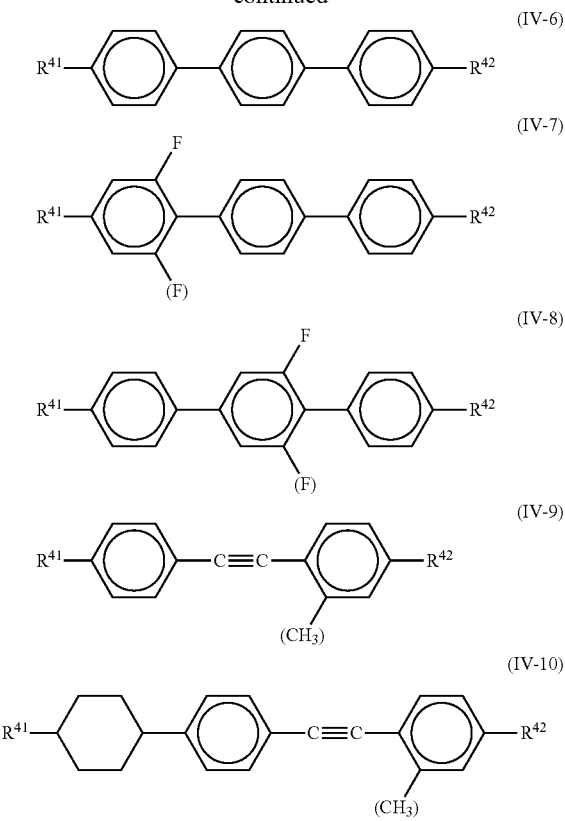

wherein R⁴¹ has the same meaning as R⁴¹ in Formula (IV) and R⁴² has the same meaning as R⁴² in Formula (IV).

Regarding the compound represented by Formula (IV), it is preferable that one kind to ten kinds of such compounds be contained, and it is particularly preferable that two kinds to eight kinds of such compounds be contained. The lower limit of the content of the compound represented by Formula (IV) is preferably 5% by mass, more preferably 10% by mass, even more preferably 20% by mass, and particularly preferably 30% by mass. The upper limit is preferably 80% by mass, more preferably 70% by mass, and even more preferably 60% by mass.

When the present invention is used in an active matrix-driven liquid crystal display element, the nematic phase-isotropic liquid phase transition temperature ($T_{ni}$) is preferably 60° C. to 120° C., and the lower limit is more preferably 65° C., and particularly preferably 70° C. The upper limit is more preferably 90° C., and particularly preferably 80° C. It is preferable that $\Delta\in$ at 25° C. be from −2.0 to −6.0, and $\Delta\in$ is more preferably from −2.5 to −5.0, and particularly preferably from −2.5 to −3.5. $\Delta n$ at 25° C. is preferably 0.08 to 0.13, but more preferably 0.09 to 0.12. To be more specific, in the case of dealing with a small cell gap, $\Delta n$ is preferably 0.10 to 0.12, and in the case of dealing with a large cell gap, $\Delta n$ is preferably 0.08 to 0.10. The viscosity at 20° C. is preferably 10 mPa·s to 30 mPa·s, but the viscosity is more preferably 10 mPa·s to 25 mPa·s, and particularly preferably 10 mPa·s to 20 mPa·s.

Furthermore, when the present invention is used in a passive matrix-driven liquid crystal display element, for consumer use applications, $T_{ni}$ is preferably from 60° C. to 120° C., and the lower limit is more preferably 65° C., and particularly preferably 70° C. The upper limit is more preferably 90° C., and particularly preferably 80° C. For in-vehicle applications and the like, the lower limit is more preferably 90° C., and particularly preferably 100° C. The upper limit is more preferably 115° C., and particularly preferably 105° C. $\Delta n$ at 25° C. is preferably from 0.08 to 0.13 for low duty driving, and particularly preferably from 0.08 to 0.11. Furthermore, $\Delta n$ at 25° C. is preferably from 0.13 to 0.20 for high duty driving, and particularly preferably from 0.15 to 0.18. $\Delta\in$ at 25° C. is preferably from −2.0 to −7.0 in low duty driving, and particularly preferably from −2.5 to −5.5. The viscosity at 20° C. is preferably from 10 mPa·s to 40 mPa·s, but the viscosity is more preferably from 10 mPa·s to 30 mPa·s, and particularly preferably from 10 mPa·s to 25 mPa·s.

The nematic liquid crystal composition of the present invention may also contain, in addition to the compounds described above, a conventional nematic liquid crystal, a smectic liquid crystal, a cholesteric liquid crystal, an oxidation inhibitor, an ultraviolet absorber, a polymerizable monomer, and the like.

The nematic liquid crystal composition of the present invention is useful for liquid crystal display elements, is useful for liquid crystal display elements for active matrix driving and liquid crystal display elements for passive matrix driving, and is particularly useful for liquid crystal display elements for passive matrix driving. Furthermore, the nematic liquid crystal composition of the present invention can be used in liquid crystal display elements for the VA mode, PSVA mode, IPS mod or ECB mode.

EXAMPLES

Hereinafter, the present invention will be described in more detail by way of Examples, but the present invention is not intended to be limited to these Examples. Furthermore, the unit "percent (%)" for the compositions of the following Examples and Comparative Examples means "percent (%) by mass".

Examples of the present invention will be introduced below, but the present invention is not intended to be limited to these.

Terms used in the Examples will be described below.

$T_{ni}$: Nematic-isotropic transition temperature [° C.]
$\Delta n$: Refractive index anisotropy (589 nm, 25° C.)
$\Delta\in$: Dielectric anisotropy (1 KHz, 25° C.)
$\eta$: Bulk flow viscosity [mPa·s](20° C.)

Response speed: Injected into a vertical alignment cell with a gap of 3.5 μm and a pretilt angle of 89°, and measured with square waves at 5 V and 100 Hz τon: Time taken for the change from transmittance 0%⇒transmittance 90% [ms]
τoff: Time taken for the change from transmittance 100% to transmittance 10% [ms]

The brevity codes described below will be used for the description of compounds in the Examples.

Brevity codes for side chains will be shown blow.

-n (number): —$C_nH_{2n+1}$ (the alkyl side chain will be expressed as a number, and a representative will be expressed as R).
-On: —$OC_nH_{2+1}$
-ndm: —($C_nH_{2n+1}$—C≡C—$(CH_2)_{m-1}$)
ndm-: $C_nH_{2n+1}$—C≡C— $(CH_2)_{m-1}$—
-nOm: —$(CH_2)_nOC_mH_{2m+1}$
nOm-: $C_nH_{2n+1}O(CH_2)_m$—
-Od(m)n: —O($CH_nH_{2n+1}$—C≡C—$(CH_2)_{m-2}$)
d(m)nO-: $C_nH_{2n+1}$—C≡C—$(CH_2)_{m-2}$O—

-Brevity codes for linking groups will be shown below.
-V-: —CO—

-VO-: —COO— (-E- is also possible)
-OV-: —OCO—
-1N-: —C=N—
-N1-: —N=C—
-T-: —C≡C—
-2-: —CH$_2$CH$_2$—
-3-: —CH$_2$CH$_2$CH$_2$—
-4-: —CH$_2$CH$_2$CH$_2$CH$_2$—
-1O-: —CH$_2$—O—
-O1-: —O—CH$_2$—
-Z-: —CH=N—N=CH—
-G-: —CF=CF—
-D-: —CH=CH—
-2D-: —CH$_2$CH$_2$CH=CH—
-D2-: —CH=CHCH$_2$CH$_2$—

Brevity codes for substituents will be shown below.
-CN: —C≡N
-F: —F
-Cl: —Cl
OCFFF: OCF$_3$
CFFF: CF$_3$
OCFF: OCHF$_2$
O1CFFF: OCH$_2$CF$_3$ Brevity codes for rings will be shown below.

[Chemical Formula 10]

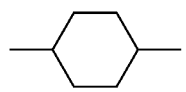 Cy

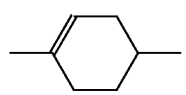 Ca

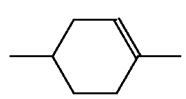 Cb

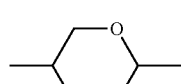 Oa

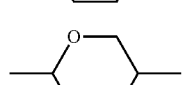 Ob

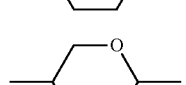 Oc

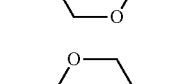 Od

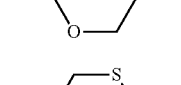 Sa

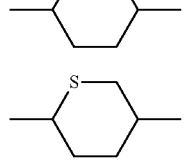 Sb

 Bc

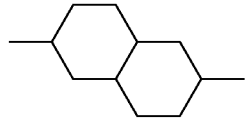 Dc

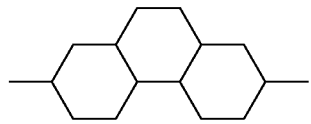 Hp

[Chemical Formula 11]

 Ph

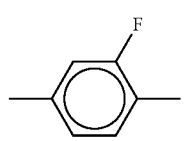 Ph1

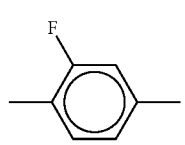 Ph2

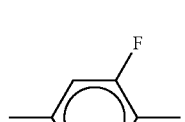 Ph3

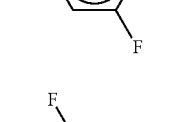 Ph4

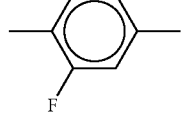 Ph5

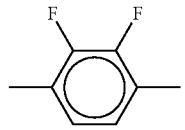 Ph6

-continued
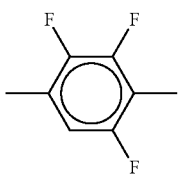
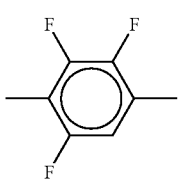
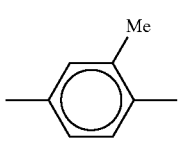
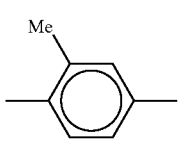
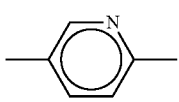
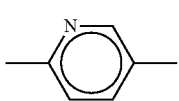
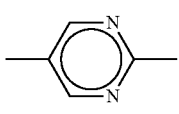
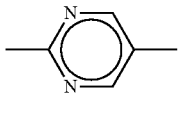
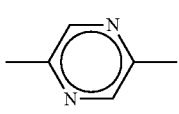
[Chemical Formula 12]
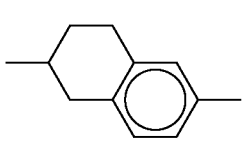
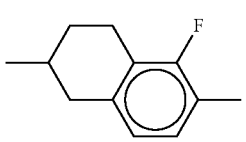
-continued
Ph7
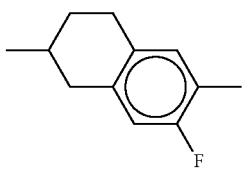
Ph8
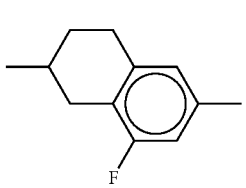
Pa1
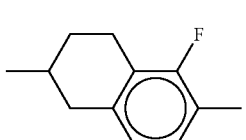
Pa2
Ya
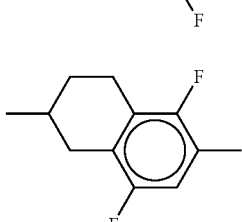
Yb
Ma
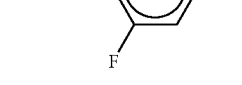
Mb
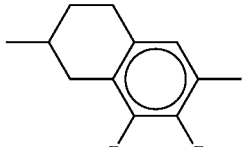
Pr
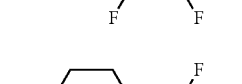
Te
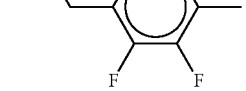
Te1
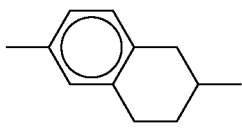
Te2
Te3
Ta1
Ta2
Ta3
Ta4
Tb
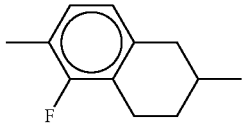
Tb1
Tb2
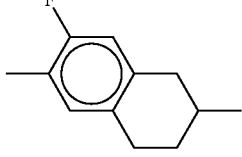

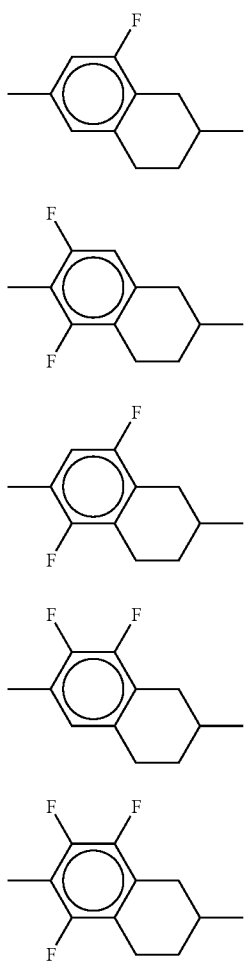
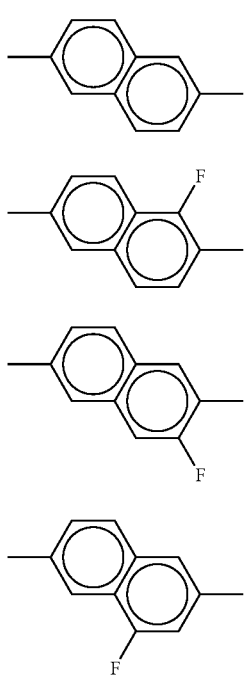
[Chemical Formula 13]
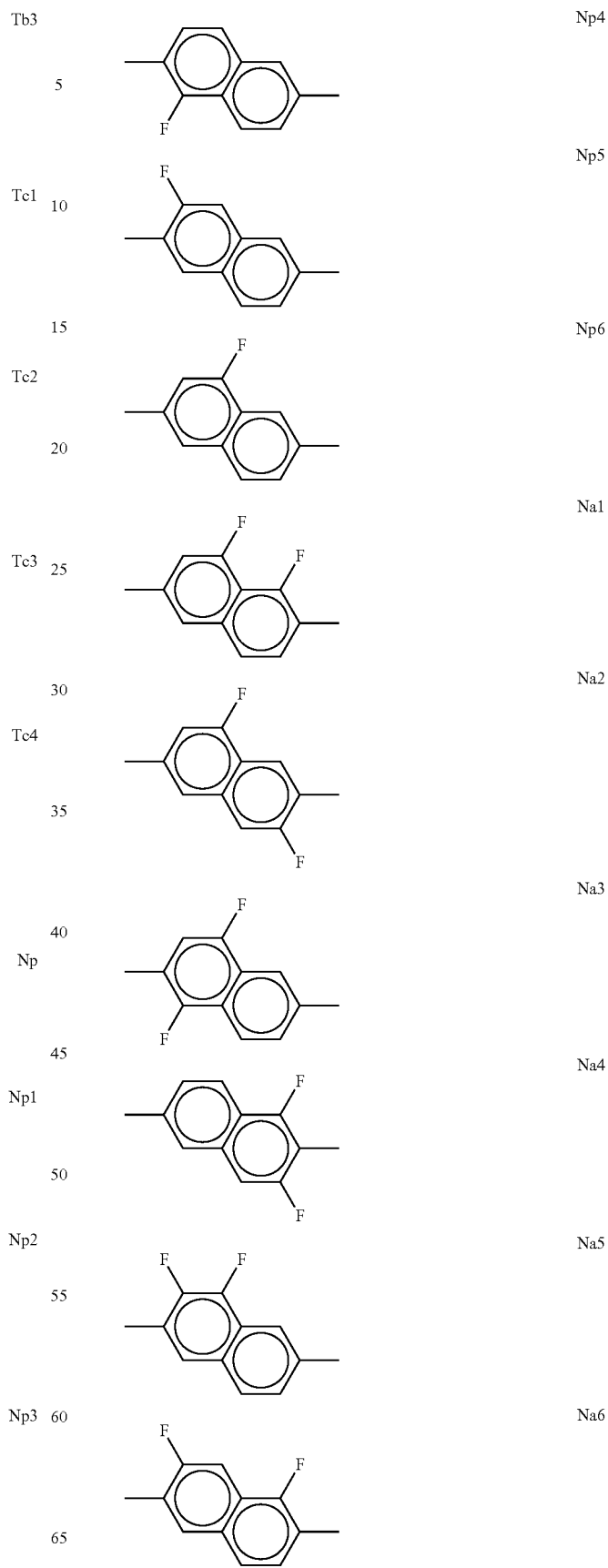

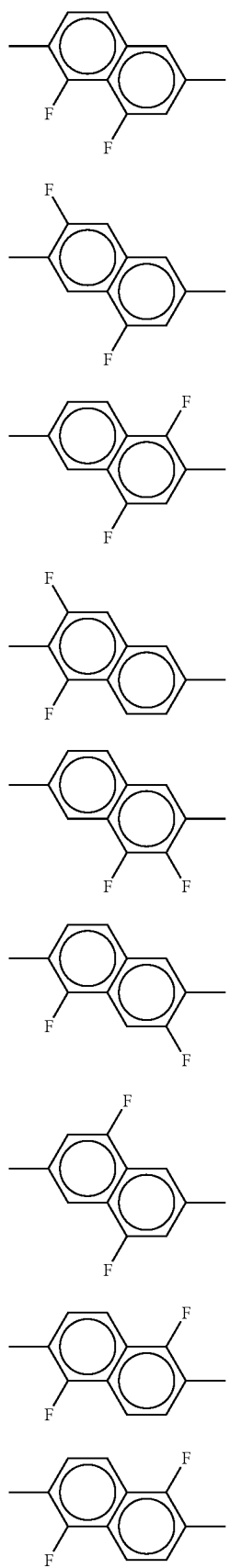
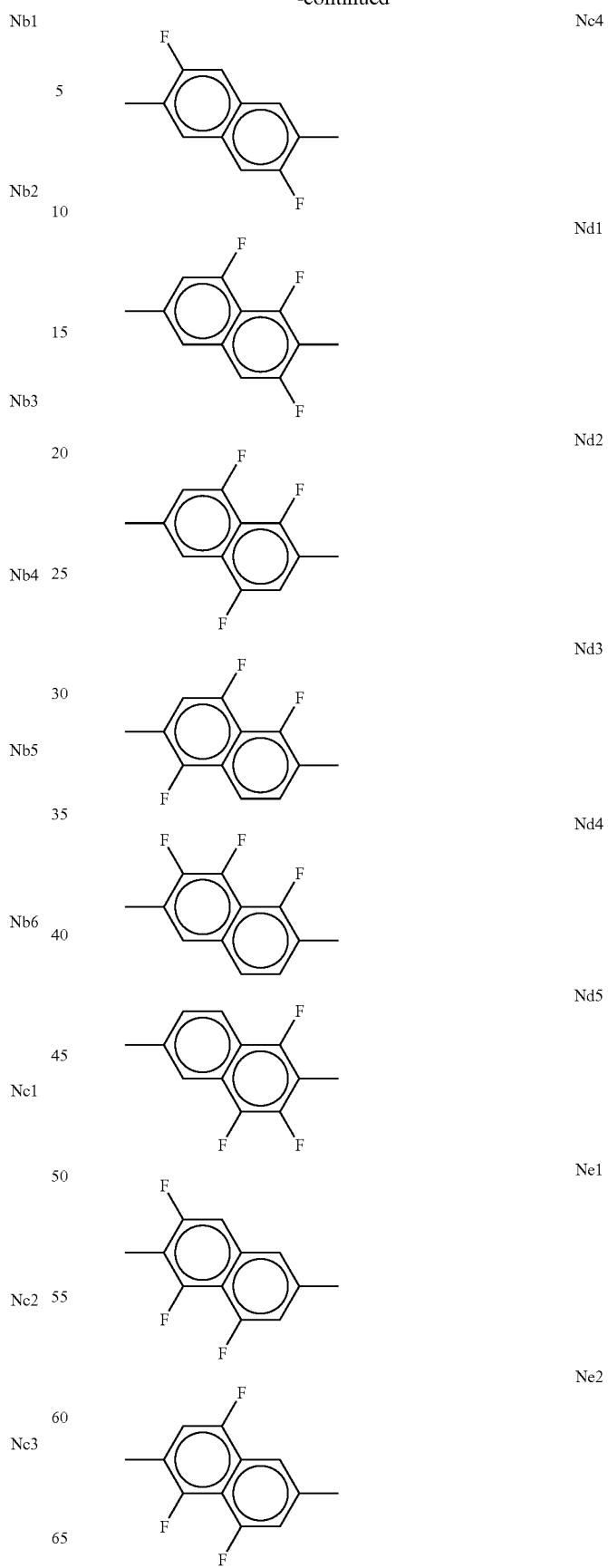

Ne3

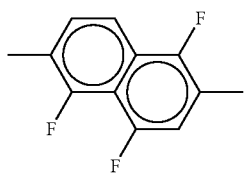

Ne4

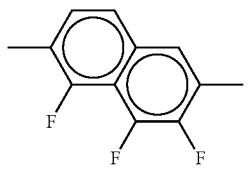

Ne5

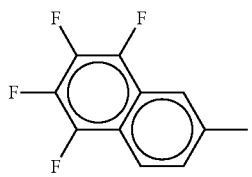

Nf1

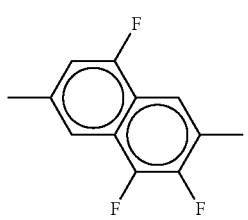

Nf2

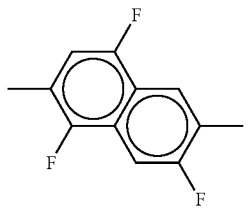

Nf3

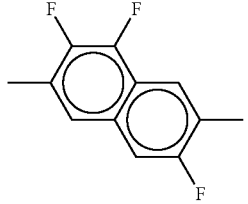

Nf4

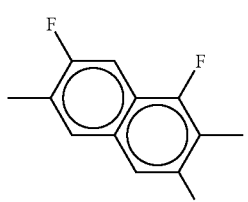

Nf5

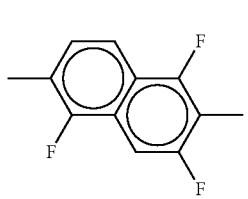

Ng1

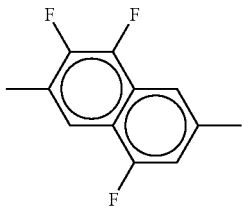

Ng2

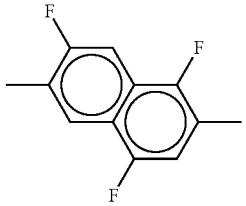

Ng3

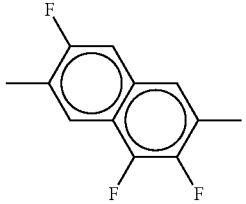

Ng4

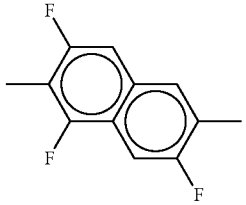

Ng5

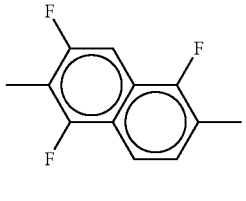

Examples 1 and 2

Nematic liquid crystal composition examples and the results for the measurement of property values will be described below.

Examples 1 and 2, and Comparative Example 1

Examples 1 and 2 are liquid crystal compositions containing compounds represented by Formula (I) and Formula (II-1), and Comparative Example 1 is a liquid crystal composition in which the compound represented by Formula (I) that is contained in Example 1 is replaced with a tolane derivative which is not substituted with fluorine atoms (3-Ph-T-Ph-O2 or the like). As compared with Comparative Example 1, Example 1 had a slight increase in viscosity, but the absolute value of Δ∈ became larger. Therefore, even if the content of the compound represented by Formula (II-1) is decreased, and the content of the so-called viscosity-reducing agent (although having a small absolute value of Δ∈, capable of lowering the viscosity of a liquid crystal composition when added thereto) is increased, a liquid crystal composition which exhibits a value of Δ∈ to the same extent as that of Comparative Example 1 can be prepared. In the liquid crystal composition described in this Example 2, the viscosity could be decreased to a large extent as compared with Comparative Example 1.

TABLE 1

|  | Comparative Example 1 | Example 1 | Example 2 |
|---|---|---|---|
| $T_{NI}$ | 95.8 | 96.6 | 96.1 |
| Δn | 0.120 | 0.121 | 0.120 |
| Δε | −2.7 | −4.8 | −2.8 |
| η | 44.5 | 48.7 | 26.2 |
| 0d1-Cy-Cy-5 |  |  | 7 |
| 0d1-Cy-Cy-3 | 12 | 12 | 20 |
| 3-Ph-T-Ph-O2 | 5 |  |  |
| 5-Ph-T-Ph-O1 | 5 |  |  |
| 3-Cy-Ph-T-Ph-2 | 5 |  |  |
| 4-Cy-Ph-T-Ph-1 | 5 |  |  |
| 0d1-Cy-Cy-Ph-1 | 11 | 11 | 10 |
| 0d3-Cy-Cy-Ph-1 | 11 | 11 | 14 |
| 0d1-Cy-1O-Ph5-O1-Cy-2 | 10 | 10 | 3 |
| 0d1-Cy-1O-Ph5-O1-Cy-3 | 10 | 10 | 3 |
| 0d1-Cy-1O-Ph5-O1-Cy-5 | 10 | 10 | 3 |
| 3-Ph-T-Ph5-O2 |  | 4 | 4 |
| 5-Ph-T-Ph5-O2 |  | 4 | 4 |
| 3-Cy-Ph-T-Ph5-O2 |  | 6 | 8 |
| 5-Cy-Ph-T-Ph5-O2 |  | 6 | 8 |
| 3-Cy-1O-Ph5-O1 | 8 | 8 | 8 |
| 3-Cy-1O-Ph5-O2 | 8 | 8 | 8 |

Examples 3 and 4, and Comparative Example 2

Examples 3 and 4 are liquid crystal compositions containing compounds represented by Formulas (I), (II-1) and (II-2), and Comparative Example 2 is a liquid crystal composition in which the compound represented by Formula (I) that is contained in Example 3 is replaced with a tolane derivative which is not substituted with fluorine atoms (3-Ph-T-Ph-O2 or the like). Similarly to the case of Examples 1 and 2 and Comparative Example 1, it was found that the viscosity was decreased to a large extent.

TABLE 2

|  | Comparative Example 2 | Example 3 | Example 4 |
|---|---|---|---|
| TNI | 105.9 | 104.0 | 102.7 |
| Δn | 0.123 | 0.124 | 0.123 |
| Δε | −3.1 | −4.8 | −3.2 |
| η | 40.8 | 43.4 | 27.5 |
| 0d1-Cy-Cy-5 |  |  | 6 |
| 0d1-Cy-Cy-3 | 20 | 20 | 20 |
| 3-Ph-T-Ph-O2 | 4 |  |  |
| 5-Ph-T-Ph-O1 | 4 |  |  |
| 3-Cy-Ph-T-Ph-2 | 4 |  |  |
| 4-Cy-Ph-T-Ph-1 | 4 |  |  |
| 0d1-Cy-Cy-Ph-1 | 12 | 12 | 14 |
| 0d3-Cy-Cy-Ph-1 | 15 | 15 | 15 |
| 3-Cy-1O-Nd4-O4 | 5 | 5 | 3 |
| 5-Cy-1O-Nd4-O2 | 5 | 5 | 3 |
| 5-Cy-1O-Nd4-O3 | 5 | 5 | 3 |
| 3-Cy-2-Cy-1O-Nd4-O2 | 5 | 5 | 3 |
| 2-Cy-Cy-1O-Nd4-O2 | 5 | 5 | 3 |
| 3-Ph-T-Ph5-O2 |  | 4 | 5 |
| 5-Ph-T-Ph5-O2 |  | 4 | 5 |
| 3-Cy-Ph-T-Ph5-O2 |  | 4 | 5 |
| 5-Cy-Ph-T-Ph5-O2 |  | 4 | 5 |
| 3-Cy-1O-Ph5-O1 | 6 | 6 | 5 |
| 3-Cy-1O-Ph5-O2 | 6 | 6 | 5 |

Examples 5 and 6, and Comparative Example 3

Examples 5 and 6 are liquid crystal compositions containing compounds represented by Formulas (I) and (II-1), and Comparative Example 1 is a liquid crystal composition in which the compound represented by Formula (II-1) that is contained in Example 1 is replaced with a compound which does not have a linking group in the molecule (3-Cy-Ph5-O2 or the like). As compared with Comparative Example 3, Example 5 had a slight increase in viscosity, but the absolute value of Δ∈ became larger. Therefore, even if the content of the compound represented by Formula (II-1) is decreased, and the content of the so-called viscosity-reducing agent (although having a small absolute value of Δ∈, capable of lowering the viscosity of a liquid crystal composition when added thereto) is increased, a liquid crystal composition which exhibits a value of Δ∈ to the same extent as that of Comparative Example 1 can be prepared. In the liquid crystal composition described in this Example 6, the viscosity could be decreased to a large extent as compared with Comparative Example 1.

TABLE 3

|  | Comparative Example 3 | Example 5 | Example 6 |
|---|---|---|---|
| $T_{NI}$ | 107.1 | 106.9 | 106.8 |
| Δn | 0.129 | 0.126 | 0.127 |
| Δε | −2.5 | −3.0 | −2.5 |
| η | 15.6 | 21.3 | 14.3 |
| 0d1-Cy-Cy-5 |  |  | 7 |
| 0d1-Cy-Cy-3 | 22 | 22 | 22 |
| 0d1-Cy-Cy-Ph-1 | 12 | 12 | 10 |
| 0d3-Cy-Cy-Ph-1 | 15 | 15 | 15 |
| 2-Cy-Cy-1O-Ph5-O2 |  | 9 | 8 |
| 3-Cy-Cy-1O-Ph5-O2 |  | 9 | 8 |
| 3-Cy-1O-Ph5-O1 |  | 9 | 4 |
| 3-Ph-T-Ph5-O2 | 6 | 6 | 7 |
| 5-Ph-T-Ph5-O2 | 6 | 6 | 7 |
| 3-Cy-Ph-T-Ph5-O2 | 6 | 6 | 6 |
| 5-Cy-Ph-T-Ph5-O2 | 6 | 6 | 6 |
| 3-Cy-Ph5-O2 | 9 |  |  |
| 2-Cy-Cy-Ph5-O2 | 9 |  |  |
| 3-Cy-Cy-Ph5-O2 | 9 |  |  |

Examples 7 and 8, and Comparative Example 4

Examples 7 and 8 are liquid crystal compositions containing compounds represented by Formulas (I) and (II-1) and Comparative Example 4 is a liquid crystal composition in which the compound represented by Formula (II-1) that is contained in Example 7 is replaced with a compound which does not have a linking group in the molecule (3-Cy-Ph5-O2 or the like). Similar to the case of Examples 5 and 6 and Comparative Example 3, it was found that the viscosity was decreased to a large extent.

TABLE 4

|  | Comparative Example 4 | Example 7 | Example 8 |
|---|---|---|---|
| $T_{NI}$ | 113.8 | 114.3 | 109.3 |
| Δn | 0.126 | 0.125 | 0.126 |
| Δε | −2.30 | −2.66 | −2.27 |
| η | 15.0 | 15.4 | 13.7 |
| 0d1-Cy-Cy-5 |  |  | 4 |
| 0d1-Cy-Cy-3 | 24 | 24 | 24 |
| 0d1-Cy-Cy-Ph-1 | 15 | 15 | 15 |
| 0d3-Cy-Cy-Ph-1 | 15 | 15 | 15 |

TABLE 4-continued

|  | Comparative Example 4 | Example 7 | Example 8 |
|---|---|---|---|
| 2-Cy-Cy-1O-Ph5-O2 |  | 12 | 9 |
| 3-Cy-Cy-1O-Ph5-O2 |  | 12 | 9 |
| 3-Ph-T-Ph5-O2 | 7 | 7 | 8 |
| 5-Ph-T-Ph5-O2 | 7 | 7 | 8 |
| 3-Cy-Ph-T-Ph5-O2 | 4 | 4 | 4 |
| 5-Cy-Ph-T-Ph5-O2 | 4 | 4 | 4 |
| 2-Cy-Cy-Ph5-O2 | 12 |  |  |
| 3-Cy-Cy-Ph5-O2 | 12 |  |  |

Examples 9 and 10, and Comparative Example 5

Examples 9 and 10 are liquid crystal compositions containing compounds represented by Formulas (I) and (II-2), and Comparative Example 5 is a liquid crystal composition in which the compound represented by Formula (I) that is contained in Example 9 is replaced with a tolane derivative which is not substituted with fluorine atoms (3-Ph-T-Ph-O2 or the like), and the compound represented by Formula (II-2) is replaced with a compound which does not have a linking group in the molecule (3-Cy-Ph5-O2 or the like). As compared with Comparative Example 5, Example 9 had a slight increase in viscosity, but the absolute value of Δε became larger. Therefore, it was found that even if the contents of the compounds represented by Formulas (I) and (II-2) are decreased, and the content of the so-called viscosity-reducing agent (although having a small absolute value of Δε, capable of lowering the viscosity of a liquid crystal composition when added thereto) is increased, a liquid crystal composition which exhibits a larger absolute value of Δε and a viscosity that is lower to a large extent as compared with Comparative Example 1 can be prepared, as is the case with the liquid crystal composition disclosed in Example 10.

TABLE 5

|  | Comparative Example 5 | Example 9 | Example 10 |
|---|---|---|---|
| $T_{NI}$ | 120.1 | 115.5 | 114.5 |
| Δn | 0.120 | 0.136 | 0.124 |
| Δε | −1.72 | −5.81 | −1.88 |
| η | 17.8 | 49.2 | 13.8 |
| 0d1-Cy-Cy-5 |  |  | 16 |
| 0d1-Cy-Cy-3 | 20 | 20 | 22 |
| 3-Ph-T-Ph-O2 | 6 |  |  |
| 5-Ph-T-Ph-O1 | 6 |  |  |
| 3-Cy-Ph-T-Ph-2 | 5 |  |  |
| 0d1-Cy-Cy-Ph-1 | 10 | 10 | 14 |
| 0d3-Cy-Cy-Ph-1 | 13 | 13 | 15 |
| 3-Cy-1O-Nd4-O4 |  | 7 |  |
| 5-Cy-1O-Nd4-O2 |  | 7 | 3 |
| 5-Cy-1O-Nd4-O3 |  | 7 | 2 |
| 3-Cy-2-Cy-1O-Nd4-O2 |  | 7 | 2 |
| 3-Cy-2-Cy-1O-Nd4-O3 |  | 6 |  |
| 2-Cy-Cy-1O-Nd4-O2 |  | 6 | 2 |
| 3-Ph-T-Ph5-O2 |  | 6 | 4 |
| 5-Ph-T-Ph5-O2 |  | 6 | 4 |
| 3-Cy-Ph-T-Ph5-O2 |  | 5 | 8 |
| 5-Cy-Ph-T-Ph5-O2 |  |  | 8 |
| 2-Cy-Cy-Ph5-O2 | 10 |  |  |
| 3-Cy-Cy-Ph5-O1 | 10 |  |  |
| 3-Cy-Cy-Ph5-O2 | 10 |  |  |
| 3-Cy-Cy-Ph5-O4 | 10 |  |  |

Examples 11 and 12, and Comparative Example 6

Examples 11 and 12 are liquid crystal compositions containing compounds represented by Formulas (I) and (II-1), and Comparative Example 6 is a liquid crystal composition in which the compound represented by Formula (II-1) that is contained in Example 11 is replaced with a compound which does not have a linking group in the molecule (2-Cy-Cy-Ph5-O2 or the like). Similarly to the case of Examples 9 and 10 and Comparative Example 5, it was found that the viscosity was decreased to a large extent.

TABLE 6

|  | Comparative Example 6 | Example 11 | Example 12 |
|---|---|---|---|
| $T_{NI}$ | 112.8 | 111.5 | 113.3 |
| Δn | 0.119 | 0.115 | 0.118 |
| Δε | −1.84 | −3.67 | −1.98 |
| η | 16.9 | 28.1 | 14.8 |
| 0d1-Cy-Cy-5 |  |  | 9 |
| 0d1-Cy-Cy-3 | 18 | 18 | 24 |
| 3-Ph-T-Ph-O2 | 5 |  |  |
| 5-Ph-T-Ph-O1 | 5 |  |  |
| 3-Ph-T-Ph-1 | 6 |  |  |
| 0d1-Cy-Cy-Ph-1 | 11 | 11 | 14 |
| 0d3-Cy-Cy-Ph-1 | 15 | 15 | 15 |
| 0d1-Cy-1O-Ph5-O1-Cy-2 |  | 14 | 6 |
| 0d1-Cy-1O-Ph5-O1-Cy-3 |  | 13 | 5 |
| 0d1-Cy-1O-Ph5-O1-Cy-5 |  | 13 | 5 |
| 3-Ph-T-Ph5-O2 |  | 3 | 3 |
| 5-Ph-T-Ph5-O2 |  | 3 | 3 |
| 3-Cy-Ph-T-Ph5-O2 |  | 5 | 8 |
| 5-Cy-Ph-T-Ph5-O2 |  | 5 | 8 |
| 2-Cy-Cy-Ph5-O2 | 10 |  |  |
| 3-Cy-Cy-Ph5-O1 | 10 |  |  |
| 3-Cy-Cy-Ph5-O2 | 10 |  |  |
| 3-Cy-Cy-Ph5-O4 | 10 |  |  |

Example 13 and Comparative Example 7

Example 13 is a liquid crystal composition containing compounds represented by Formula (I), Formula (II-1) and Formula (II-2), and Comparative Example 7 is a liquid crystal composition in which the compound represented by Formula (I) that is contained in Example 13 is replaced with a tolane derivative which is not substituted with fluorine atoms (3-Ph-T-Ph-1 or the like). These liquid crystal compositions have the values of $T_{NI}$, Δn and Δε matched. It was found that Example 13 had its viscosity greatly improved.

TABLE 7

|  | Comparative Example 7 | Example 13 |
|---|---|---|
| $T_{NI}$ | 102 | 102 |
| Δn | 0.180 | 0.180 |
| Δε | −2.64 | −22.70 |
| η | 31.0 | 22.3 |
| 0d1-Cy-Cy-5 | 4 | 14 |
| 1d3-Ph-T-Ph-1d3 | 17 | 10 |
| 3-Ph-T-Ph-1 | 10 | 6 |
| 0d1-Cy-Cy-Ph-1 | 10 | 14 |
| 0d3-Cy-Cy-Ph-1 | 7 | 10 |
| 3-Cy-Ph-T-Ph-2 | 6 |  |
| 4-Cy-Ph-T-Ph-1 | 6 |  |
| 3-Cy-Ph-T-Pa2-1 | 3 |  |
| 3-Cy-VO-Ph-T-Ph-1 | 2 |  |
| 3-Cy-1O-Nd4-O4 | 4 | 4 |
| 5-Cy-1O-Nd4-O2 | 4 | 3 |
| 5-Cy-1O-Nd4-O3 | 3 | 3 |
| 3-Cy-2-Cy-1O-Nd4-O2 | 3 |  |
| 2-Cy-Cy-1O-Nd4-O2 | 3 |  |
| 0d1-Cy-1O-Ph5-O1-Cy-2 | 9 |  |
| 0d1-Cy-1O-Ph5-O1-Cy-3 | 9 | 5 |
| 3-Ph-T-Ph5-O2 |  | 7 |
| 5-Ph-T-Ph5-O2 |  | 8 |

TABLE 7-continued

|  | Comparative Example 7 | Example 13 |
|---|---|---|
| 3-Cy-Ph-T-Ph5-O2 |  | 8 |
| 5-Cy-Ph-T-Ph5-O2 |  | 8 |

Example 14 and Comparative Example 8

Example 14 is a liquid crystal composition containing compounds represented by Formula (I), Formula (II-1) and Formula (II-2), and Comparative Example 8 is a liquid crystal composition in which the compound represented by Formula (I) that is contained in Example 14 is replaced with a tolane derivative which is not substituted with fluorine atoms (3-Ph-T-Ph-1 or the like). These liquid crystal compositions have the values of $T_{NI}$, $\Delta n$ and $\Delta \in$ matched. It was found that Example 14 had its viscosity greatly improved.

TABLE 8

|  | Comparative Example 8 | Example 14 |
|---|---|---|
| $T_{NI}$ | 101.9 | 101.2 |
| $\Delta n$ | 0.200 | 0.200 |
| $\Delta \epsilon$ | −2.72 | −2.81 |
| $\eta$ | 33.5 | 24.1 |
| 0d1-Cy-Cy-5 |  | 13 |
| 1d3-Ph-T-Ph-1d3 | 16 | 12 |
| 3-Ph-T-Ph-1 | 14 | 8 |
| 4-Ph-T-Ph-O2 | 3 |  |
| 0d1-Cy-Cy-Ph-1 | 12 | 8 |
| 1d3-Cy-Cy-Ph-1 |  | 4 |
| 3-Cy-Ph-T-Ph-2 | 6 | 4 |
| 4-Cy-Ph-T-Ph-1 | 6 | 4 |
| 3-Cy-Ph-T-Pa2-1 | 3 |  |
| 3-Cy-VO-Ph-T-Ph-1 | 6 |  |
| 3-Cy-1O-Nd4-O4 | 4 | 4 |
| 5-Cy-1O-Nd4-O2 | 4 | 4 |
| 5-Cy-1O-Nd4-O3 | 4 | 4 |
| 3-Cy-2-Cy-1O-Nd4-O2 | 3 |  |
| 2-Cy-Cy-1O-Nd4-O2 | 3 |  |
| 0d1-Cy-1O-Ph5-O1-Cy-2 | 8 |  |
| 0d1-Cy-1O-Ph5-O1-Cy-3 | 8 | 5 |
| 3-Ph-T-Ph5-O2 |  | 7 |
| 5-Ph-T-Ph5-O2 |  | 7 |
| 3-Cy-Ph-T-Ph5-O2 |  | 8 |
| 5-Cy-Ph-T-Ph5-O2 |  | 8 |

Examples 15 and 16

Example 15 is a liquid crystal composition having the value of $\Delta n$ adjusted to be as low as 0.089, and Example 16 is a liquid crystal composition having the value of $\Delta n$ adjusted to be as high as 0.200. Furthermore, liquid crystal compositions having large absolute values of $\Delta \in$ in which the absolute values of $\Delta \in$ were as large as 5.9 to 5.6, and voltage reduction could be achieved in a wide range of $\Delta n$, could be prepared. It was found that the liquid crystal compositions of the present invention can have the values of $\Delta n$ and $\Delta \in$ adjusted in accordance with various requirement characteristics, and low viscosity can be realized.

TABLE 9

|  | Example 15 | Example 16 |
|---|---|---|
| $T_{NI}$ | 93.5 | 101.5 |
| $\Delta n$ | 0.089 | 0.200 |
| $\Delta \epsilon$ | −5.90 | −5.60 |
| $\eta$ | 28.9 | 65.6 |
| 1d1-Cy-Cy-3 | 20 |  |
| 1d3-Ph-T-Ph-1d3 |  | 10 |
| 3-Ph-T-Ph-1 |  | 5 |
| 0d1-Cy-Cy-Ph-1 | 5 |  |
| 0d3-Cy-Cy-Ph-1 | 5 |  |
| 3-Cy-Ph-T-Ph-2 |  | 4 |
| 4-Cy-Ph-T-Ph-1 |  | 4 |
| 3-Cy-1O-Nd4-O4 |  | 5 |
| 5-Cy-1O-Nd4-O2 |  | 5 |
| 5-Cy-1O-Nd4-O3 |  | 5 |
| 0d1-Cy-1O-Ph5-O1-Cy-2 | 6 | 10 |
| 0d1-Cy-1O-Ph5-O1-Cy-3 | 15 | 11 |
| 0d1-Cy-1O-Ph5-O1-Cy-5 |  | 11 |
| 3-Ph-T-Ph5-O2 |  | 7 |
| 5-Ph-T-Ph5-O2 |  | 7 |
| 3-Cy-Ph-T-Ph5-O2 | 3 | 8 |
| 5-Cy-Ph-T-Ph5-O2 |  | 8 |
| 3-Cy-Cy-VO-Ph5-O2 | 10 |  |
| 3-Cy-1O-Ph5-O1 | 8 |  |
| 3-Cy-1O-Ph5-O2 | 10 |  |
| 2-Cy-Cy-1O-Ph5-O2 | 8 |  |
| 3-Cy-Cy-1O-Ph5-O2 | 10 |  |

Examples 17 to 19

Examples 17 to 19 are liquid crystal compositions in which $T_{NI}$ is as high as 104° C., and the values of $\Delta n$ and $\Delta \in$ are also respectively set to be high. It is usually difficult to obtain a liquid crystal composition which satisfies such requirement characteristics, but the present invention enables this. Furthermore, an increase in viscosity could also be suppressed.

TABLE 10

|  | Example 17 | Example 18 | Example 19 |
|---|---|---|---|
| $T_{NI}$ | 104.1 | 106.0 | 107.3 |
| $\Delta n$ | 0.247 | 0.232 | 0.231 |
| $\Delta \epsilon$ | −6.9 | −7.6 | −7.7 |
| $\eta$ | 48.8 | 51.1 | 41.2 |
| 1d3-Ph-T-Ph-1d3 | 5 | 3 |  |
| 3-Ph-T-Ph-1 | 5 | 2 | 6 |
| 0d1-Cy-Cy-Ph-1 | 5 |  |  |
| 3-Cy-1O-Nd4-O4 | 5 |  |  |
| 5-Cy-1O-Nd4-O2 | 5 |  |  |
| 5-Cy-1O-Nd4-O3 | 5 |  |  |
| 0d1-Cy-1O-Ph5-O1-Cy-2 |  | 10 |  |
| 0d1-Cy-1O-Ph5-O1-Cy-3 |  | 10 |  |
| 0d1-Cy-1O-Ph5-O1-Cy-5 |  | 5 |  |
| 3-Cy-1O-Ph5-O2 |  |  | 10 |
| 2-Cy-Cy-1O-Ph5-O2 |  |  | 6 |
| 3-Cy-Cy-1O-Ph5-O2 |  |  | 10 |
| 3-Ph-T-Ph5-O2 | 20 | 20 | 18 |
| 5-Ph-T-Ph5-O2 | 20 | 20 | 18 |
| 3-Cy-Ph-T-Ph5-O2 | 15 | 15 | 16 |
| 5-Cy-Ph-T-Ph5-O2 | 15 | 15 | 16 |

The invention claimed is:

1. A liquid crystal composition comprising:

as a first component, one or more compounds selected from compounds represented by Formula (I):

[Chemical Formula 1]

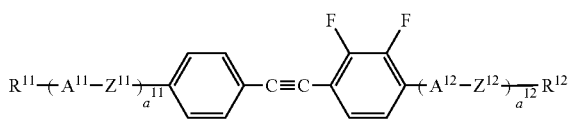

(I)

wherein $R^{11}$ and $R^{12}$ each independently represent an alkyl group having 1 to 8 carbon atoms, an alkoxy group having 1 to 8 carbon atoms, or an alkenyl group having 2 to 8 carbon atoms, while these groups are each independently unsubstituted or have at least one halogen group as a substituent, and one or more of —$CH_2$— present in these groups may be each independently substituted by —O—, —S—, —CO—, —COO—, —OCO— or —OCO—O— such that oxygen atoms are not directly bonded to each other;

$A^{11}$ and $A^{12}$ each independently represent a group selected from the group consisting of:

(a) a trans-1,4-cyclohexylene group (wherein one —$CH_2$— or non-adjacent two or more of —$CH_2$—, which are present in this group, may be substituted by —O— and/or —S—, (b) a 1,4-phenylene group (wherein one —CH= or non-adjacent two or more of —CH= groups, which are present in this group, may be substituted by —N=), and (c) 1,4-bicyclo(2.2.2)octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen;

$Z^{11}$ and $Z^{12}$ each independently represent —COO—, —OCO—, —$CH_2O$—, —$OCH_2$—, —$CF_2O$—, —$OCF_2$—, —$CH_2CH_2$—, —CH=CH—, —C≡C—, —$(CH_2)_4$—, —CH=CH—$CH_2CH_2$—, —$CH_2CH_2$—CH=CH—, or a single bond;

$a^{11}$ and $a^{12}$ each independently represent 0 or 1; and as a second component, one or more compounds selected from compounds represented by Formulas (II) and (III):

[Chemical Formula 2]

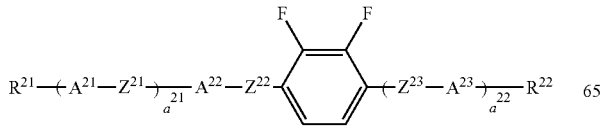

(II)

-continued

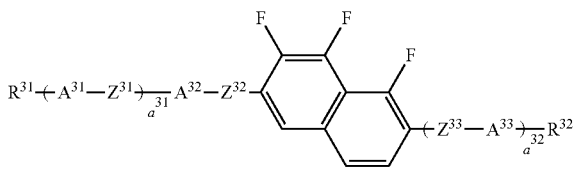

(III)

wherein $R^{21}$, $R^{22}$, $R^{31}$ and $R^{32}$ each independently represent an alkyl group having 1 to 8 carbon atoms, an alkoxy group having 1 to 8 carbon atoms, or an alkenyl group having 2 to 8 carbon atoms, while these groups are each independently unsubstituted or have at least one halogen group as a substituent, and one or two or more of —$CH_2$— present in these groups may be each independently substituted by —O—, —S—, —CO—, —COO—, —OCO— or —OCO—O— such that oxygen atoms are not directly bonded to each other;

$A^{21}$, $A^{22}$, $A^{23}$ each independently represent a group selected from the group consisting of:

(a) a trans-1,4-cyclohexylene group (wherein one —$CH_2$— or non-adjacent two or more of —$CH_2$—, which are present in this group, may be substituted by —O— and/or —S—, (b) a 1,4-phenylene group (wherein one —CH= or non-adjacent two or more of —CH=groups, which are present in this group, may be substituted by —N=), and (c) 1,4-bicyclo(2.2.2)octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen;

$Z^{21}$, and $Z^{23}$ each independently represent —COO—, —OCO—, —$CH_2O$—, —$OCH_2$—, —$CF_2O$—, —$OCF_2$—, —$CH_2CH_2$—, —CH=CH—, —C≡C—, —$(CH_2)_4$—, —CH=CH—$CH_2CH_2$—, —$CH_2CH_2$—CH=CH—, or a single bond;

$Z^{22}$ represents —COO—, —OCO—, —$CH_2O$—, —$OCH_2$—, —$OCF_2$—, —$CH_2CH_2$—, —CH=CH—, —C≡C—, —$(CH_2)_4$—, —CH=CH—$CH_2CH_2$—, —$CH_2CH_2$—CH=CH—, or a single bond;

$A^{31}$, $A^{32}$ and $A^{33}$ each independently represent a group selected from the group consisting of:

(a) a trans-1,4-cyclohexylene group (wherein one —$CH_2$— or non-adjacent two or more of —$CH_2$—, which are present in this group, may be substituted by —O— and/or —S—;

(b) a 1,4-phenylene group (wherein one —CH= or non-adjacent two or more of —CH= groups, which are present in this group, may be substituted by —N=) and (c) 1,4-cyclohexenylene, 1,4-bicyclo(2.2.2)octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen;

$Z^{31}$, $Z^{32}$ and $Z^{33}$ each independently represent —COO—, —OCO—, —CH$_2$O—, —OCH$_2$—, —CF$_2$O—, —OCF$_2$—, —CH$_2$CH$_2$—, —CH═CH—, —C≡C—, —(CH$_2$)$_4$—, —CH═CH—CH$_2$CH$_2$—, —CH$_2$CH$_2$—CH═CH—, or a single bond; and $a^{21}$, $a^{22}$, $a^{31}$ and $a^{32}$ each independently represent 0 or 1, the liquid crystal composition comprising at least one compound represented by Formula (II) in which $Z^{22}$ represents —CH$_2$O—, or at least one compound represented by Formula (III) in which $Z^{32}$ represents —CH$_2$O— or —CF$_2$O—.

2. The liquid crystal composition according to claim 1, comprising, as a third component, one or more compounds selected from compounds represented by Formula (IV):

[Chemical Formula 3]

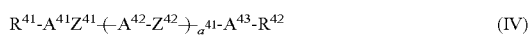

(IV)

wherein R$^{41}$ and R$^{42}$ each independently represent an alkyl group having 1 to 8 carbon atoms, an alkoxy group having 1 to 8 carbon atoms, or an alkenyl group having 2 to 8 carbon atoms, while these groups are each independently unsubstituted or have at least one halogen group as a substituent, and one or two or more of —CH$_2$— present in these groups may be each independently substituted by —O—, —S—, —CO—, —COO—, —OCO— or —OCO—O— such that oxygen atoms are not directly bonded to each other;

A$^{41}$, A$^{42}$ and A$^{43}$ each independently represent a group selected from the group consisting of:
(a) a trans-1,4-cyclohexylene group (wherein one —CH$_2$— or non-adjacent two or more of —CH$_2$—, which are present in this group, may be substituted by —O— and/or —S—,
(b) a 1,4-phenylene group (wherein one —CH═ or non-adjacent two or more of —CH═ groups, which are present in this group, may be substituted by —N═), and
(c) 1,4-cyclohexenylene, 1,4-bicyclo(2.2.2)octylene, piperidine-1,4-diyl, naphthalene-2,6-diyl, decahydronaphthalene-2,6-diyl, or 1,2,3,4-tetrahydronaphthalene-2,6-diyl, while the hydrogen atoms on the group (a), group (b) and group (c) may be each independently substituted by an alkyl group having 1 to 3 carbon atoms, an alkenyl group having 2 or 3 carbon atoms, an alkoxy group having 1 to 3 carbon atoms, an alkenyloxy group having 1 to 3 carbon atoms, CN or halogen, but A$^{41}$, A$^{42}$ and A$^{43}$ are not intended to represent a 2,3-dihalo-1,4-phenylene group;

$Z^{41}$ and $Z^{42}$ each independently represent —COO—, —OCO—, —CH$_2$O—, —OCH$_2$—, —CF$_2$O—, —CF$_2$—, —CH$_2$CH$_2$—, —CH═N—N═CH—, —CH═CH—, —C≡C—, —(CH$_2$)$_4$—, —CH═CH—CH$_2$CH$_2$—, —CH$_2$CH$_2$—CH═CH—, or a single bond; and A$^{41}$ represents 0, 1 or 2, but when a$^{41}$ represents 2, the two A$^{42}$'s that are present may be identical or different from each other, and when a$^{41}$ represents 2, the two Z$^{42}$'s that are present may be identical or different from each other.

3. The liquid crystal composition according to claim 2, wherein the second component is one or more compounds selected from compounds represented by Formula (II).

4. The liquid crystal composition according to claim 1, wherein the second component is one or more compounds selected from compounds represented by Formula (III).

5. The liquid crystal composition according to claim 1, wherein the second component is one or more compounds represented by Formula (II) in which $Z^{22}$ represents —CH$_2$O—.

6. The liquid crystal composition according to claim 1, wherein the second component is one or more compounds represented by Formula (III) in which $Z^{32}$ represents —CH$_2$O— or —CF$_2$O—.

7. The liquid crystal composition according to claim 2, wherein the third component is one or more compounds in which a$^{41}$ is 0; A$^{41}$ and A$^{43}$ are trans-1,4-cyclohexylene groups; and Z$^{41}$ is a single bond.

8. The liquid crystal composition according to claim 1, wherein the total amount of the first component and the second component is from 10% by mass to 80% by mass.

9. The liquid crystal composition according to claim 1, wherein the nematic-isotropic transition temperature is 70° C. to 120° C., the dielectric anisotropy is −1.5 to −8.0, and the birefringence is 0.080 to 0.250.

10. The liquid crystal composition according to claim 9, comprising a photopolymerizable monomer in an amount of 500 ppm to 5000 ppm.

11. A liquid crystal display element using the liquid crystal composition according to claim 10.

12. The liquid crystal display element according to claim 11, wherein the pretilt angle is 80° to 90°.

13. The liquid crystal display element according to claim 11, being an active matrix-driven type element.

14. The liquid crystal display element according to claim 11, being a passive matrix-driven type element.

* * * * *